United States Patent [19]

Goodall et al.

[11] Patent Number: 4,603,888
[45] Date of Patent: Aug. 5, 1986

[54] END FITTING

[75] Inventors: Richard L. Goodall; Paramjit Singh, both of Chestertown, Md.

[73] Assignee: Dixon Valve & Coupling Company, Chestertown, Md.

[21] Appl. No.: 777,350

[22] Filed: Sep. 18, 1985

[51] Int. Cl.$^4$ .............................................. F16L 9/14
[52] U.S. Cl. ..................................... 285/55; 285/174; 285/243; 285/251; 285/259; 285/332.3
[58] Field of Search ............... 285/256, 259, 174, 149, 285/55, 40, 252, 253, 243, 251, 332.3; 138/109

[56] References Cited

U.S. PATENT DOCUMENTS

| 3,142,502 | 7/1964 | Luther | 285/259 X |
| 3,224,794 | 12/1965 | Crissy | 285/423 X |
| 3,791,680 | 2/1974 | Cleare | 285/251 X |
| 3,992,044 | 11/1976 | Muslin | 285/251 X |

FOREIGN PATENT DOCUMENTS 471616 9/1937 United Kingdom ................ 285/251

Primary Examiner—Dave W. Arola
Attorney, Agent, or Firm—John F. A. Earley; John F. A. Earley, III

[57] ABSTRACT

An end fitting for rubber steam hoses with metal liners of interlocking construction comprises a stem that has zig-zag serrations formed on an intermediate portion of its outer surface for contacting and retaining the inside of a rubber hose, and has rib-type right hand spirals formed on an inner end portion of its outer surface so that a metal liner of interlocking construction is adapted to be screwed onto the spirals for retention of the metal liner from being pulled off the ste. on the stem and preventing the metal liner from being pulled off the stem. A clamp is provided that clamps the rubber hose against the zig-zag serrations to seal the end fitting against the escape of steam, and clamps the rubber hose against the metal liner and the metal liner against the spirals and the inner end portion of the stem outer surface to provide added retention of the metal liner from being pulled off the stem. A portion of the metal liner is always between the stem and the clamp to provide this extra retention and safety against the metal liner being pulled off the stem.

5 Claims, 3 Drawing Figures

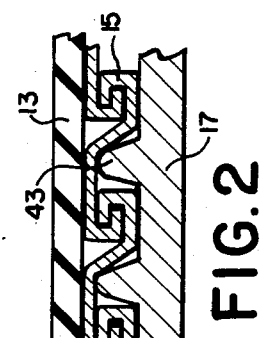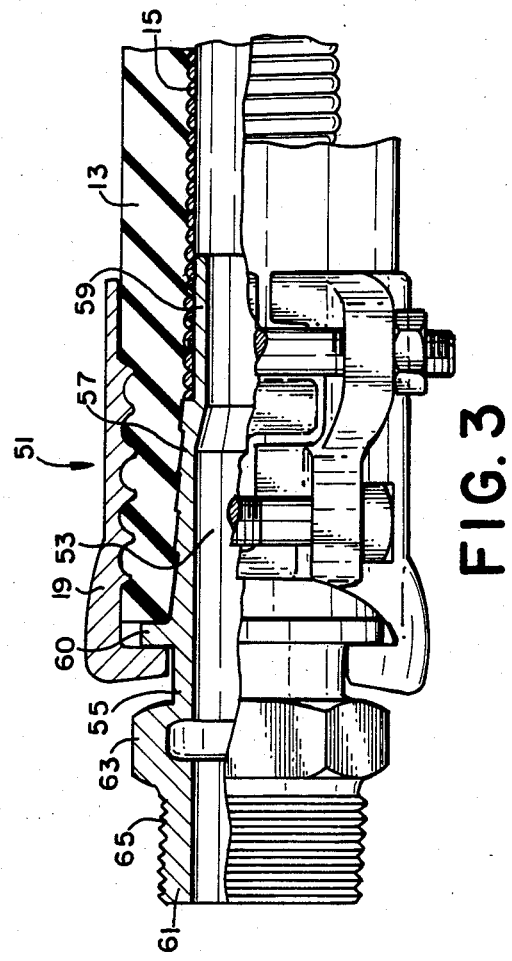

END FITTING

BACKGROUND OF THE INVENTION

1. Field of the Invention

This invention relates to end fittings, and more particularly concerns end fitting assemblies for rubber steam hoses with metal liners of interlocking construction.

2. Description of the Prior Art

It is conventional in the prior art to provide an end fitting for metal lined rubber steam hoses that requires a bronze sleeve which is fitted inside the stem of the end fitting and inside the metal liner of the hose and is brazed to the stem and to the hose metal liner at the place where the stem and liner abut. The bronze sleeve must be precisely made to fit the inner diameter of the stem. Such precision is expensive. Also, the sleeve is bronze, the metal liner of the hose is stainless steel, the stem is a malleable iron casting, and the brazing of dissimilar metals is difficult. In order to make the iron casting malleable, it is cast of white iron and heat treated for 24 hours to give malleability to the stem for machining of the inside bore. However, the brazing changes a portion of the malleable iron of the stem to white iron which is very brittle, and this may create problems.

SUMMARY OF THE INVENTION

It is an object of this invention to provide an end fitting that does not require a precision made bronze sleeve, that eliminates the brazing operation, and that is easier to install than prior art devices.

This object is accomplished by providing an end fitting for rubber steam hoses with metal liners of interlocking construction comprising a stem having zig-zag serrations formed on an intermediate portion of its outer surface for contacting and retaining the inside of a rubber hose, rib-type right hand spirals formed on an inner end portion of its outer surface so that a metal liner of interlocking construction is adapted to be screwed onto the spirals for retention of the metal liner on the stem and preventing the metal liner from being pulled off the stem, and clamping means for clamping the rubber hose against the zig-zag serrations for sealing the end fitting against the escape of steam, and for clamping the rubber hose against the metal liner and the metal liner against the spirals and the inner end portion of the stem outer surface to provide added retention of the metal liner against pull off. A portion of the metal liner is positioned between the stem and the clamping means to provide extra retention and safety against pull out of the metal liner.

BRIEF DESCRIPTION OF THE DRAWINGS

FIG. 2 is fragmentary enlargement taken as indicated by the circle 2 which appears in FIG. 1; and FIG. 3 is a sectional front view of a male end fitting assembly constructed in accordance with this invention.

DETAILED DESCRIPTION

Figure 1:
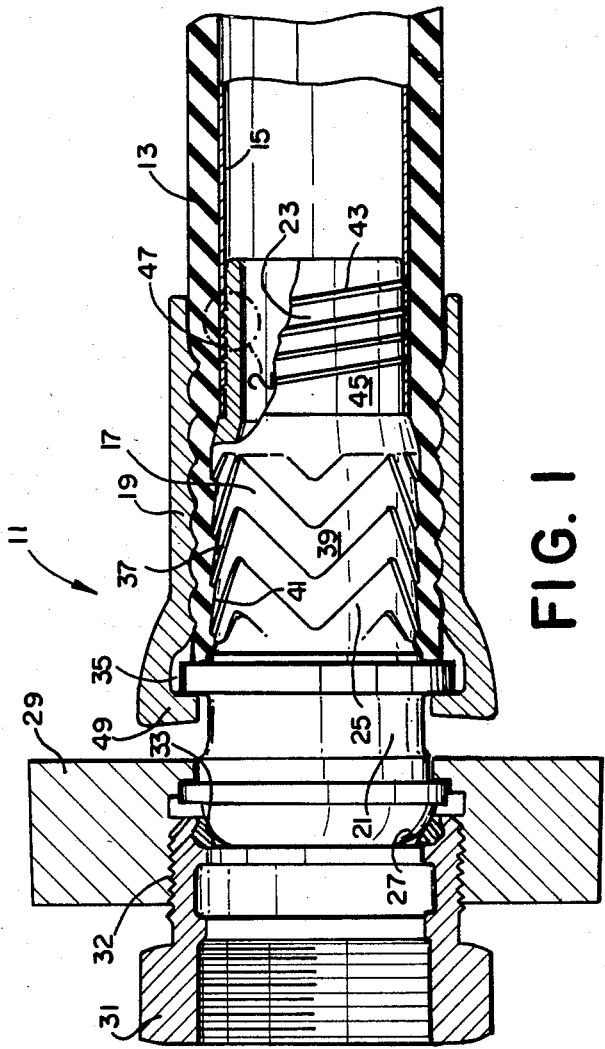
FIG. 1 is a sectional front view of a female end fitting assembly constructed in accordance with this invention.

Turning to the drawings, there is shown in FIG. 1 a female end fitting 11 for a rubber steam hose 13 with a metal liner 15 of interlocking construction. End fitting 11 comprises a stem 17 and a clamp 19 that clamps a portion of rubber hose 13 against stem 17, and that clamps another portion of rubber hose 13 against metal liner 15 and metal liner 15 against stem 17.

Stem 17 has an outer end portion 21, an inner end portion 23 and an intermediate portion 25, and is provided with a ground joint head 27 at the outer end of portion 21.

A nut 29 is assembled onto stem outer end portion 21, and a female spud 31 that has outside threads 32 is mounted on nut 29 by screwing female spud 31 into nut 29.

A copper seat 33 is rolled in the spud 31 which provides a seal between stem 17 and spud 31 as ground joint head 27 and spud 31 press into copper seat 33 when spud 31 is screwed into nut 29.

Stem 17 is provided with integral collar 35 at the juncture between stem portions 21 and 25 which provides a stop for gripping fingers 49 of clamp 19.

Zig-zag serrations 37 on the outer surface 39 of stem intermediate portion 25 contact and retain the inside surface 41 of rubber hose 13.

Rib-type right hand spirals 43 are formed on the outer surface 45 of stem inner end portion 23, and metal liner 15 is adapted to be screwed onto spirals 43 to retain metal liner 15 on stem 17 and prevent metal liner 15 from being pulled off stem 17.

As shown in FIG. 2, interlocking metal liner 15 is of spiral construction, and it cannot be removed from the stem by rotating metal liner 15 counterclockwise because such rotation decreases the inner diameter of metal liner 15 by forcing the spirals of metal liner 15 closer together, and thereby clamps metal liner 15 onto spirals 43 of stem 17 more forcibly. So while metal liner 15 may be screwed onto stem spirals 43 easily by rotating metal liner 15 clockwise, metal liner 15 cannot be removed by unscrewing it from stem 17 by rotating metal liner 15 counterclockwise.

Clamp 19 clamps rubber hose 13 against zig-zag serrations 37 of stem intermediate portion 25 and seals the end fitting 11 against the escape of steam. Clamp 19 also clamps rubber hose 13 against metal liner 15 and metal liner 15 against spirals 43 and stem inner end portion 23 to provide added retention of metal liner 15 from being pulled off stem 17.

The length of stem inner end portion 23 in relation to the length of clamp 19 is such that a portion 47 of metal liner 15 is always between stem 17 and clamp 19 to provide extra retention and safety against pull out.

Female end fitting 11 is assembled by pulling the end of metal liner 15 out of rubber hose 13 and screwing it onto the rib spirals 43 of stem 17. Rubber hose 13 is then pulled up over metal liner 15 and stem intermediate portion 25 so that zig-zag serrations 37 are covered by rubber hose 13. Clamp 19, which has gripping fingers 49, is positioned so that gripping fingers 49 engage the outer end of collar 35, and clamp 19 is then tightened around hose 13, portion 47 of metal liner 15, and stem 17.

A male end fitting assembly 51 is shown in FIG. 3 and includes a stem 53 which has an outer portion 55, an intermediate portion 57, and a rib-type spiral inner end portion 59. Stem intermediate portion 57 is identical with stem intermediate portion 25 of FIG. 1, and stem inner end portion 59 is identical with stem inner end portion 23 of FIG. 1, but stem outer end portion 55, however, differs from stem outer end portion 21.

Stem 53 is provided with an integral collar 60 at the juncture between stem portions 57 and 55 which provides a stop for gripping fingers 49 of clamp 19. Outer end portion 55 has an engagement portion 61 that includes a hex shaped portion 63 and outer threads 65.

ADVANTAGES

End fitting 11 of the present invention does not need a bronze sleeve, and eliminates the complicated brazing operation which is conventional in the prior art.

Installation of end fitting 11 onto hose 13 and metal liner 15 is easier since metal liner 15 is simply screwed onto stem 17 and clamped.

The new end fitting 11 fastens metal liner 15 to stem 17 in a positive manner to prevent pull out. The new end fitting 11 has a double anchoring:

1. the stem spirals 43 provide for screwing the metal liner 15 onto the stem 17 and prevent unscrewing because the spirals 43 contract when the liner is rotated counterclockwise, and 2. the clamp 19 presses hose 13 and metal liner 15 onto stem 17 which gives extra retention to metal liner 15.

In the prior art device which brazes a bronze sleeve onto the abutting stem and liner, the clamp is short of the metal liner and never presses the metal liner onto the stem. In the new end fitting 11, a portion of the metal liner is always under the clamp which presses it against inner end portion 59 of stem 53.

New end fitting 11 also provides for sealing of the rubber hose against leakage of steam by pressing the rubber hose against the zig-zag serrations of the stem.

We claim:

1. An end fitting assembly for rubber steam hoses with metal liners of interlocking construction comprising
    a stem having an outer end portion, an intermediate portion and an inner end portion,
    said intermediate portion and inner end portion being received within the hose,
    zig-zag serrations formed on and circumferentially around the outer surface of the intermediate portion of the stem contacting and retaiing the inside of a rubber hose,
    rib-type hand spirals formed on the outer surface of the stem's inner end portion so that the metal liner of interlocking construction is screwed onto the spirals for retention of the metal liner on the stem and preventing the metal liner from being pulled off the stem,
    and clamping means for clamping the rubber hose against the zig-zag serrations of the intermediate portion of the stem for sealing the end fitting against the escape of steam, and for clamping the rubber hose against the metal liner and the metal liner against the spirals and stem inner end portion to provide added retention of the metal liner from being pulled off the stem,
    the length of the stem inner portion in relation to the length of the clamping means being such that a portion of the metal liner is always between the stem and the clamping means to provide extra retention and safety against pull out.

2. The end fitting assembly of claim 1, further including
    an integral collar at the juncture between the intermediate stem portion and the outer stem portion to act as an end stop for the end of the rubber hose and also to act as an end stop that is engaged by the clamping means.

3. The end fitting assembly of claim 1, further including
    a nut that is assembled onto the stem outer end portion,
    said nut having a female spud mounted thereto.

4. The end fitting assembly of claim 1,
    said clamping means being a clamp.

5. An end fitting assembly for rubber steam hoses with metal liners of interlocking construction comprising
    a stem having an outer end portion, an intermediate portion, and an inner end portion,
    said intermediate portion and inner end portion being received within the hose,
    zig-zag serrations formed on and circumferentially around the outer surface of the intermediate portion of the stem contacting and retaining the inside of a rubber hose,
    rib-type right hand spirals formed on the outer surface of the stem's inner end portion so that the metal liner of interlocking construction is screwed onto the spirals for rentention of the metal liner on the stem and preventing the metal liner from being pulled off the stem,
    and clamping means for clamping the rubber hose against the zig-zag serrations of the intermediate portion of the stem for sealing the end fitting against the escape of steam, and for clamping the rubber hose against the metal liner and the metal liner against the spirals and stem's inner end portion to provide added retention of the metal liner from being pulled off the stem,
    the length of the stem inner portion in relation to the length of the clamping means being such that a portion of the metal liner is always between the stem and the clamping means to provide extra retention and safety against the metal liner being pulled off the stem,
    an integral collar between the stem's intermediate portion and the stem's outer portion to act as an end stop for the end of the rubber hose and also to act as an end that is engaged by the clamping means,
    a nut that is assembled onto the stem outer end portion,
    said nut having a female spud mounted thereto,
    said clamping means being a clamp.

* * * * *